United States Patent [19]

Iyama et al.

[11] Patent Number: 4,585,940
[45] Date of Patent: Apr. 29, 1986

[54] OPTICAL DETECTOR

[75] Inventors: Kenichi Iyama, Chiba; Toru Hosaka, Tokyo, both of Japan

[73] Assignee: Dowa Mining Co., Ltd., Tokyo, Japan

[21] Appl. No.: 526,873

[22] Filed: Aug. 26, 1983

[30] Foreign Application Priority Data

Jul. 23, 1983 [JP] Japan ................ 58-134927

[51] Int. Cl.⁴ .............................................. G01J 1/00
[52] U.S. Cl. ........................................... 250/336.1
[58] Field of Search ............... 250/336.1, 338 R, 342, 250/341, 214 B

[56] References Cited

U.S. PATENT DOCUMENTS 3,842,257 10/1974 Köhler ........................... 250/214 B
4,059,762 11/1977 Horrocks ....................... 250/336.1
4,434,363 2/1984 Yorifuji et al. ............... 250/214 B Primary Examiner—Janice A. Howell
Attorney, Agent, or Firm—Cushman, Darby & Cushman

[57] ABSTRACT

An optical detector or an optically detecting apparatus comprises divider means for outputting not only a light source flash signal which divides an oscillation signal with frequency higher than that of an expected disturbance light but also an operating time signal divided into a divided ratio a plurality of times longer than the first mentioned divided ratio, shift means for successively shifting a light signal receptive to a light receptive element by a clock input synchronous with the oscillation signal during the time when the operating time signal is inputted, and means for outputting a light detection signal when the shift output corresponds to the set value as compared with one another and terminating the light detection signal when the operating time signal is terminated. Further, the optical detector includes invisible light sources and light receptive elements disposed in a plurality of pairs, and means for indexing only one pair, updating the index when said operating time signal is terminated, then changing over the light source flash signal in an inputtable condition to only the invisible light source indexed by the index means and only the index light receptive element in an enable condition.

2 Claims, 5 Drawing Figures

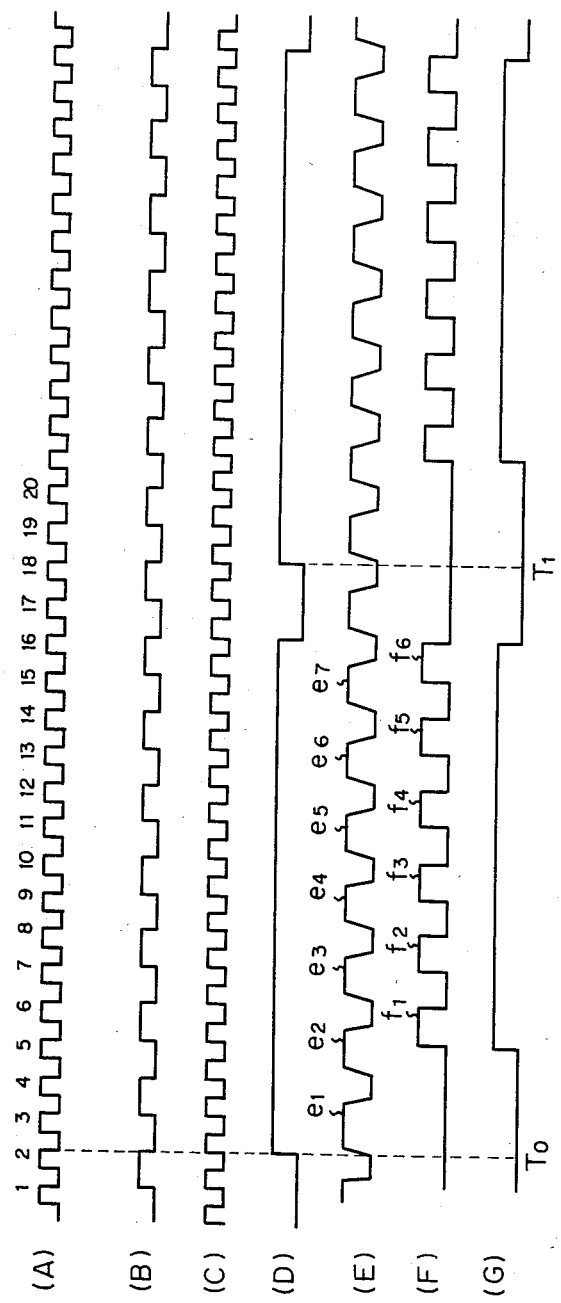

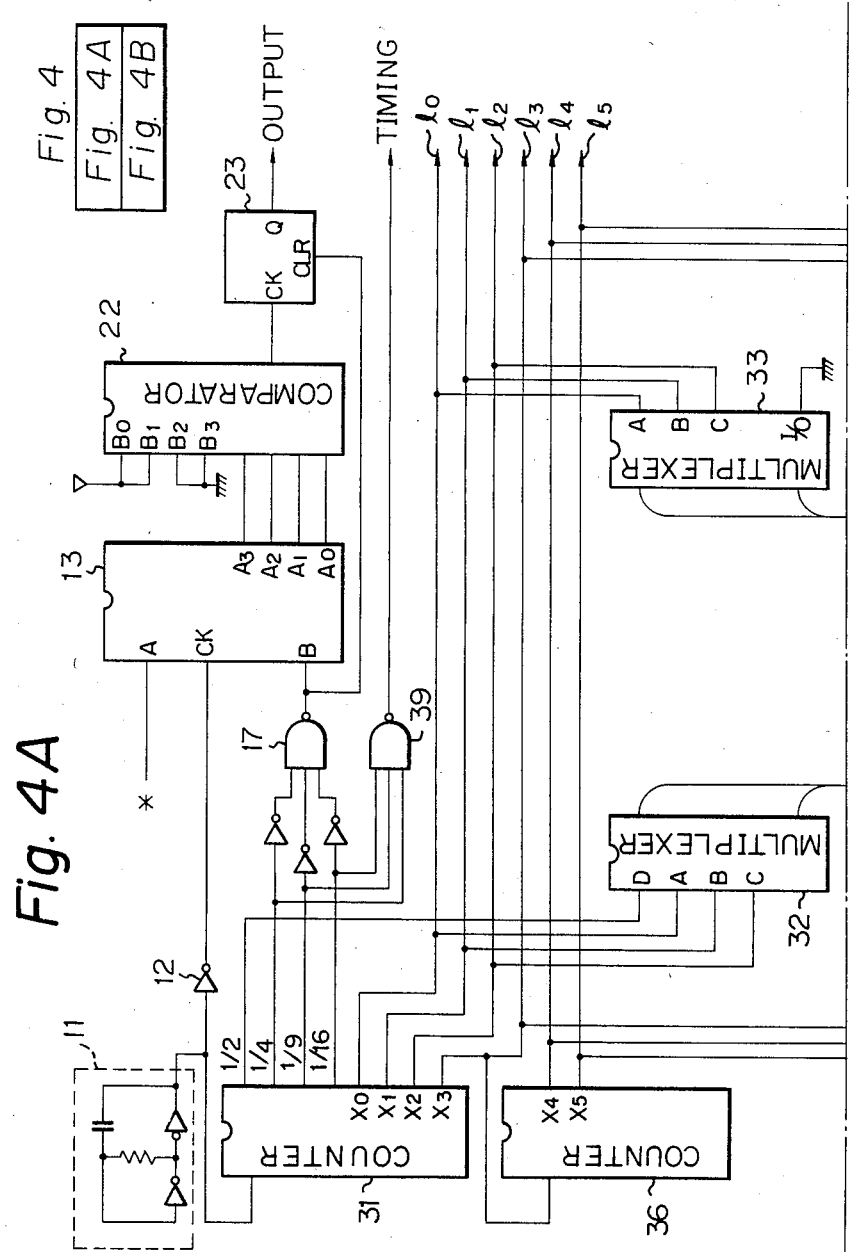

OPTICAL DETECTOR

BACKGROUND OF THE INVENTION

1. Field of the Art

This invention relates to an optical detector for optically detecting the presence of an object.

2. Prior Art

A circuit configuration as shown in FIG. 1 (Prior art) has been generally well known as an apparatus for optically detecting the presence of an object. This circuit is designed so that an infrared-ray emitted when a predetermined voltage is applied through a resistance to an anode of an infrared-ray light emitting diode 1 (hereinafter referred to as "light emitting diode") having a grounded cathode, is received by a phototransistor 2 causing an electric photocurrent to increased in a collector thereof grounded through a resistance R1. This current produces a voltage output across resistance R1 which is detected to determine whether the object is present between the light emitting diode 1 and the phototransistor 2.

Disturbance light of an artificial or natural illumination under which the circuit is used, is, however, detected by the phototransistor 2 to thus increase a collector current, displacing an operative point of the phototransistor 2. This involves disadvantage in that sensitivity for sensing the light from the light emitting diode 1 is lowered.

Due to a noise current derived from the disturbance light, electronic devices such as a computer and the like are likely to malfunction when the output from the circuit is directly connected thereto. For prevention of such malfunction, a complicated analog circuit has been required to eliminate noise the output current from of phototransistor 2.

SUMMARY OF THE INVENTION

This invention is provided in consideration of the aforementioned circumstances. It is an object of the present invention to provide an optical detecting apparatus which is excellent in detection and simple in structure without being influenced by disturbance light.

In order to accomplish the aforementioned object, the optical detector according to the present invention is arranged so that a light source flash signal which divides an oscillation signal with frequency higher than that of an expected disturbance light and an operating time signal divided into a divided ratio a plurality of times longer than the first mentioned divided ratio are outputted, and that a light signal receptive to a light receptive element by a clock input synchronous with the oscillation signal during the time when the operation time signal is inputted is successively shifted, and that the output of a light detection signal is set when the shift output corresponds to the set value as compared with one another whereas the output of the light detection signal is terminated when the operating time signal does not work.

Another object of the invention is to provide an optically detecting apparatus with a high degree of accuracy for not only detecting presence of the object but also simplifying the structure in detecting location of the object.

To this end, the optical detection is fabricated so that invisible light sources and light receptive elements are disposed in plurality of pairs, and that one pair is indexed out of them to renew such index when the operating time is terminated, and that the light source flash signal is changed over to an inputtable condition for only the indexed invisible light source whereas only the indexed light receptive element is switched over to an enable condition.

Further objects and advantages of the invention will become apparent upon consideration of the specification and the following accompanying drawings.

BRIEF DESCRIPTION OF THE DRAWINGS

FIG. 3 is a time chart explanatory of the manner in which what is shown in FIG. 2 is operated; and FIG. 4A and FIG. 4B are circuit block diagrams for the purpose of illustrating another embodiment where the optical detector of the present invention is used for detecting a position.

DESCRIPTION OF THE PREFERRED EMBODIMENTS

Figure 1:
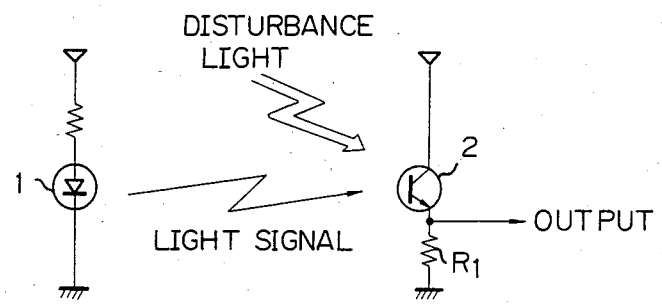
FIG. 1 is a main circuit block diagram of a conventional optical detector.
Figure 2:
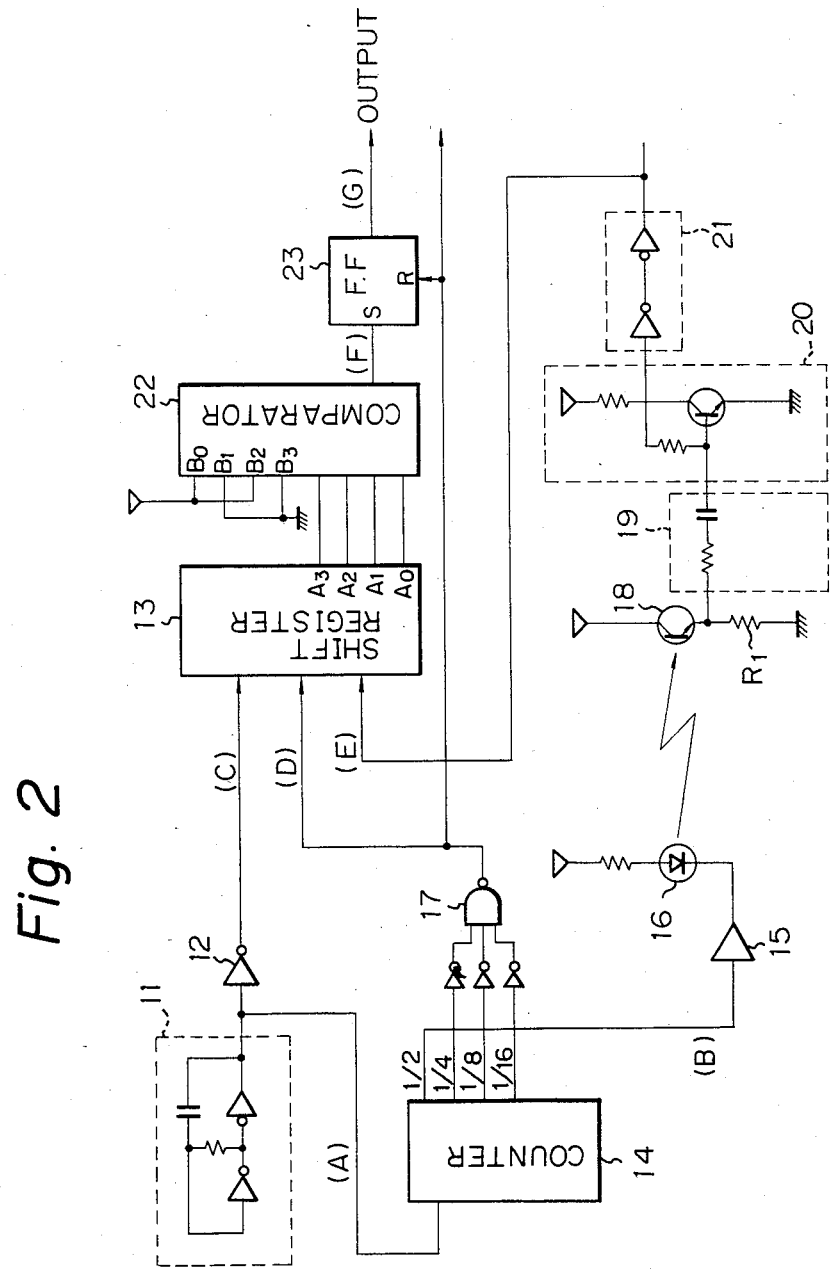
FIG. 2 is a circuit block diagram for the purpose of illustrating one embodiment of the present invention.

The preferred embodiment will be described with reference to FIG. 2 through FIG. 4B. Referring now particularly to FIG. 2 showing a circuit block diagram of the present invention, an oscillation circuit 11 is adapted to input a rectangular oscillation signal of high frequency a plurality of times more than frequency of an expected disturbance light. This oscillating signal is inputted by an inverter 12 as a shift clock into a shift register 13 and is also directly inputted as a counter signal to a counter 14 of four bits. The counter 14 counts the falling of the counter signal as inputted and outputs divided signals of $\frac{1}{2}$, $\frac{1}{4}$, $\frac{1}{8}$ and 1/16, respectively. The $\frac{1}{2}$ divided signal is applied by an amplifier 15 to a cathode of an infrared emitting diode (hereinafter referred to as "emitting diode") 16. A positive voltage is in turn applied by a resistance to an anode of the emitting diode 16. An electric current is drained to the emitting diode 16 for lighting whenever the cathode is at a low level. The $\frac{1}{4}$, $\frac{1}{8}$ and 1/16 divided signals are inputted through the respective inverters into a NAND gate 17 the output of which provides an operating time signal for the shift register 13. In other words, the operating time signal is given to the shift resister 13 when at least one of the $\frac{1}{4}$, $\frac{1}{8}$ and 1/16 signals is outputted at which time the shift resister 13 is rendered operable.

A phototransistor 18 is disposed in opposition to the emitting diode 16. A value of a resistance R1 for voltage level adjustment, one end of which is connected to a collector of the phototransistor 18, is set to sense a photo signal from the emitting diode 16 and also set to a little extent so that saturation derived from a disturbance light may be eliminated. The signal from the phototransistor 18 is transmitted to a differentiation circuit 19, then differentiated thereby, and outputted into an amplifier 20 for its amplification. The output of the amplifier 20 is given to a filter circuit 21 composed of a C-MOS where noise is eliminated by a delay and the like of responsibility of the C-MOS. As a result, a light detection signal a wave form of which is shaped is applied to the input terminal of the shift register 13.

The shift register 13 is adapted to store at one digit $A_0$ a light signal applied to the input terminal by the rising of the shift clock to be inputted while the operating time signal is inputted. The shift register then shifts the stored content at each digit to a digit up one place. The bit outputs at lower four digits $A_0$–$A_3$ of the shift register 13 are inputted into a comparator 22. On the other hand, levels such as "high", "low", "high" and "low" are set to correspond to digits $B_0$–$B_3$ of the comparator 22. The stored contents at these digits $B_0$–$B_3$ and the bit outputs from the digits $A_0$–$A_3$ as inputted correspond to and compare with each other to find the contents at the digit corresponding so that the coincidence signal is outputted into a flip flop 23. The flip flop 23 is set by the rising of the coincidence signal, and the set output is outputted as the light detection signal for the emitting diode 16. The flip flop 23 includes an R terminal to which the operating time signal is transmitted, and is reset by the falling of the operating time signal.

Operation of the apparatus should be apparent from the following description.

For example, if no object is present between the emitting diode 16 and the phototransistor 18, the osillation signal is outputted from the oscillation circuit as shown in FIG. 3(A) whereas the ½ divided signal is transmitted to the emitting diode 16 as shown in FIG. 3(B). Thus, the emitting diode 16 is lit for the low level period of that divided signal. On the other hand, a shift clock is given to the shift register 13 by a filter formed of the C-MOS in such a manner that the phase shift of the shift clock is shifted by a half period from the oscillation signal as shown in FIG. 3(C). As illustrated in FIG. 3(D), the operating time signal is repeatedly provided continuously of the period corresponding to the seven periods of the oscillation signal at every two period thereof. As seen from FIG. 3(E), a light signal is inputted by shaping a waveform of a detection signal of infrared ray of the emitting diode 16 lit in response to the low level of the ½ divided signal. The reason why the time delay in the waveform shown in FIG. 3(E) is caused is derived from delay in the filter circuit 21 and from factors such as the time required for having infrared rays from the emitting diode 16 reached the phototransistor 18, and so on.

Now the time is $T_0$ and the second oscillation signal is counted, the ½ and ¼ divided signals at low and high levels are respectively outputted from the counter 14. As a result, the emitting diode 16 is lit to provide the operating time signal for the shift register 13. At the same time, the low level signal applied to the input terminal of the shift clock is stored in the digit $A_0$ at timing when the shift clock is inputted into the shift register. Next, the third oscillation signal is counted to output the ½ and ¼ divided signals at low and high levels, respectively from the counter 14 so that the emitting diode 16 is lit out to continuously output the operating time signal. At the same time, the shift register 13 takes up the light signal applied to the input terminal thereof to maintain the contents of the digits $A_0$, $A_1$ at high and low levels. When the fifth oscillation signal is counted by the counter 14, the digits $A_0$–$A_3$ of the shift register 13 are stored at "high", "low", "high" and "low" levels. Each oscillation signal is compared with each of the set values of the digits $B_0$–$B_3$ in the comparator 22 to output the coincidence signal as shown in FIG. 3(F). By the rising of the coincidence signal, the flip flop 23 is set to output the light detection signal as shown in FIG. 3(G). When the switch oscillation signal is then counted by the counter 14, the digits $A_0$–$A_3$ of the shift register 13 are shifted at "low", "high", "low" and "high" levels to thus render them inconsist with the contents of the comparator 22 to terminate the output of the coincidence. The light detection signal is, however, continuously outputted since the flip flop 23 continues its setting. At the time when 7th, 9th, 11th, 13th and 15th oscillation signals fall, the coincidence signal is outputted whereas the output of the coincidence signal is terminated at the time when 8th, 10th, 12th, 14th and 16th oscillation signals fall. When the 16th oscillation signal falls, the content of the counter 14 is nil so that the output of the operating time is terminated to maintain the shift register 13 in a disenable condition simultaneously with falling of the operating time signal to reset the flip flop 23. As a result, the output of the light detection signal is terminated. The same operation as aforementioned is repeatedly performed when the 18th oscillation signal falls, that is, at the falling time $T_1$ of the oscillation signal second from the point where the operating time signal is terminated.

For instance if the waveform of the light signal $e_2$ out of the light signals $e_1$–$e_7$ repeatedly inputted into the shaft register 13 during the operating time signal being outputted, is distorted and such signal is taken up at a low level by the shift register 13, the coincidence signals $f_1$, $f_2$ out of the signals $f_1$–$f_6$ outputted during the operating time signal being outputted, and are outputted until extincted, however, the signals $f_3$–$f_6$ are outputted to thus output the coincidence detection signal by rising of the light signal $f_3$ to ensure a detection operation.

When the object is interposed between the emitting diode 16 and the phototransistor 18, the ½ divided signal from the counter 14 is at a low level so that no infrared rays are detected on the phototransistor 18 even if the emitting diode 16 is lit. Accordingly, no coincidence signal is outputted from the comparator 21 since the light signal is not inputted into the shift register 13 during the time when the operating time signal is inputted thereinto.

Figure 4B:
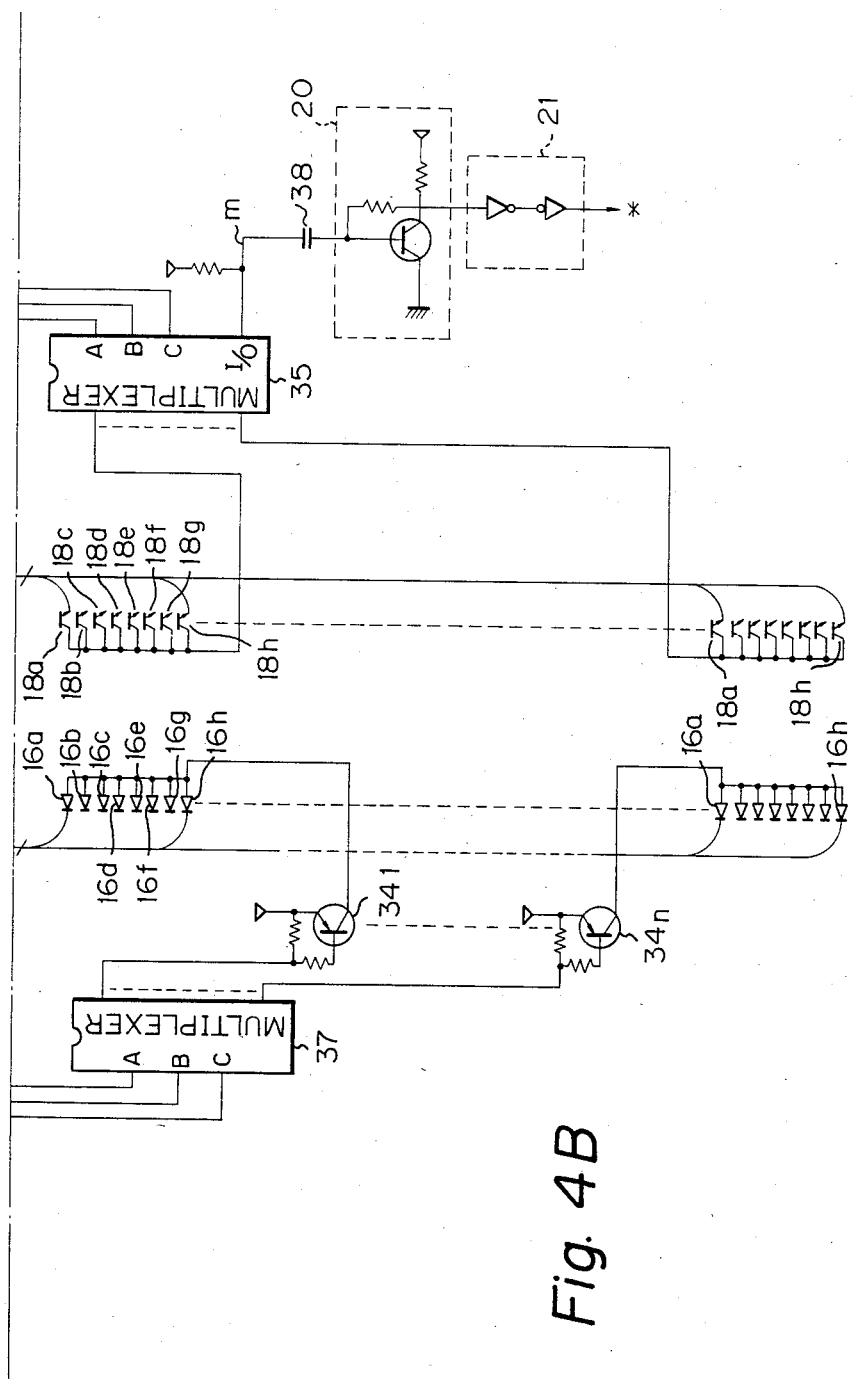

FIG. 4A and FIG. 4B are a representation showing an embodiment in a case where the optical detector is employed for position detection, wherein like reference numerals designate like or corresponding parts shown in FIGS. 4A and 4B. The details of the optical detector are not described to avoid redundancies. In this instance, the optical detector uses a counter 31 of eight bits instead of the counter 14 of four bits and outputs the ½, ¼, ⅛ and 1/16 signals into which the oscillation signal, inputted from the oscillation circuit 11, which is divided at lower four digits as above described. The detector also sends each of the bit outputs at upper four digits $X_0$, $X_1$, $X_2$ and $X_3$ to a data processor (not shown) via lines $l_0$, $l_1$, $l_2$, $l_3$. The output from the digits $X_0$, $X_1$ and $X_2$ of the counter 31 is inputted into a multiplexers 32, 33. The multiplexer 32 includes eight output terminals which are respectively connected to cathodes of the emitting diodes 16a–16h. These anodes are connected in common with each other and to a collector of a transistor 34. The ½ divided signal is inputted into the multiplexer 32 and adapted to so change over a connection as to permit of supply of the ½ divided signal to one of the emitting diodes 16a–16h in response to the input data from the digits $X_0$, $X_1$ and $X_2$. The eight output terminals of the multiplexer 33 are respectively connected to the collectors of the phototransistors 18a–18h. These emitters are connected in common with each other and to one output terminal corresponding to the multiplexer 35. The multiplexer 33 is adapted to ground one of the collectors of the phototransistors 18a–18h in response to the input data from the digits $X_0$, $X_1$, and $X_2$ and to designate it in an operative condition. The emitting diodes 16a–16h and the phototransistors 18a–18h are spaced at a predetermined distance in oposition to each other in pairs. One set is composed of eight pairs thereof.

On the other hand, the output from the digit $X_3$ of the counter 31 is inputted into the counter 36 whereas the output of the digits $X_4$, $X_5$ of the counter 36 as well as the output of the digit $X_3$ is inputted into the multiplexers 37, 35. The output of the multiplexer 37 is connected to each of the bases of the transistors $34_1$–$34_n$ indexing the set and maintains one of the bases of the transistors $34_1$–$34_n$ at low levels and the bases of the remaining transistors at high levels to index one operable set in response to the input data from the digits $X_3$, $X_4$ and $X_5$. Each of the collectors of the transistors $34_1$–$34_n$ is connected to each of the anodes of one set of the respective emitting diodes 16a–16h and is "on" to apply the voltage to the anode of each of the emitting diodes during the time when the base is maintained at a low level. The output of the multiplexer 35 is connected to the emitter each of the respective phototransistors 18a–18h in set. Each of the emitters of the phototransisters in set corresponding to the input data from the digits $X_3$, $X_4$ and $X_5$ is connected to a line m. A positive voltage is applied by a resistance to the line m to maintain the phototransistors connected in set in an enable condition. The signal through the line m is inputted as the light signal through a condenser 38, the amplifier 20, and the filter circuit 21 to the shift register 13.

The $\frac{1}{4}$, $\frac{1}{8}$ and 1/16 divided signals outputted from the counter 31 are inputted into the NAND circuit 39. This output as well as the light detection signal of the flip flop 23 are inputted into the data processor. The bit outputs from the digits $X_4$, $X_5$ are also inputted by the lines $l_4$, $l_5$ to the data processor. The other arrangement is similar to what is shown in FIG. 3 and thus not explained further.

Operation of the optical detector shown in FIGS. 4A and 4B will be explained hereinafter. For instance, if each of the outputs of the counters 31, 36 is maintained at a low level, the signals (low, low and low) are inputted into the multiplexer 37 to output the low level signal into the base of the transistor $34_1$. Consequently, each of the anodes of the emitting diodes 16a–16h in set connected to the transistor $34_1$ is connected in an enable condition. Similarly, the multiplexer 35 selects a set of the phototransistors 18a–18h in pair with the emitting diode in an enable condition to connect each of the emitters of the phototransistors to the line m. The multiplexer 32 connects the emitting diode 16a to the $\frac{1}{2}$ divided signal to render it inputtable by the data input from the digits $X_0$, $X_1$ and $X_2$ (low, low, and low) whereas the multiplexer 33 grounds the collector of the phototransistor 18a to set it in an enable condition. That is, in such a condition, only the emitting diode 16a and the phototransistor 18a in pair are indexed in an enable condition to send the content each of the digits $X_0$–$X_5$ as the address data indicative of a condition for indexing.

During the time when the counter 31 in the index condition counts the oscillation signal from first through sixteenth from the oscillation circuit 11, the aforementioned operation as shown in FIG. 3 is performed by the diode 16a and the phototransistor 18a in pair, as indexed. As the counter 31 counts the 14 oscillation signal, the output of the NAND circuit 39 is changed from the one at a high level to the other at a low level at which time the light detection signal outputted from the flip flop 23 is sent as a timing signal for reading the light detection signal. When the counter 31 counts the 16th oscillation signal, the output of the operation time signal and the light detection signal is terminated as seen from FIG. 3 whereas the output of the NAND circuit 39 is converted to the one at a high level. Further, at this moment, the high level signal is outputted from the digit $X_0$ of the counter 31 so that the multiplexers 32, 33 are correspondingly converted to the diode 16a and the phototransistor 18a to index the emitting diode 16b and the phototransistor 18b in an enable condition. During the time when the counter 31 counts the first through sixteenth oscillation signals for the second, the emitting diode 16b provides seven flashes, and the aforementioned operation is repeatedly performed based thereon. Upon repetition of the same operation eight times to terminate detection operation of the emitting diode 16b and the phototransistor 18h in pair, the high level signal is outputted from the digit $X_3$ of the counter 31. As a result, the multiplexer 37 outputs the low level signal into the base of the transistor $34_2$ and applies the anode each of the emitting diodes in next pair whereas the multiplexer 35 changes over a connection of the emitter each of the phototransistors in this pair to the line m. In the entirely same manner as aforementioned, the emitting diode and the phototransistor in pair as indexed, are successively indexed to perform the same detection operation. It is noted that the address data indicative of the emitting diode and the phototransistor in pairs is sent from the digits $X_0$–$X_5$. As above set forth, the emitting diode and the phototransistor in pairs are successively indexed to detect presence of the object in the indexed position. Presence of the object may be discriminated by having the data processor read presence of the light detection signal from the flip flop 23 when the timing signal outputted from the NAND circuit 39 is changed over to the one at a low level.

Although the embodiment of the invention has been described with reference to a specific arrangement made so that the emitting diodes and the phototransistors are unidirectionally disposed in a plurality of pairs, they may be vertically and transversely disposed to detect location of the object on plane.

As precisely set forth hereinbefore, the present invention is designed to be excellent in detection of a coming light from the invisible light source without being subjected to the influence of the disturbance light and eliminates use of the complicated analog circiut to render the structure simple and compact. This invention aims at not only detection of presence of the object but also detection of location thereof with simplicity of structure, high accuracy, and excellent result.

While only the preferred forms of the invention has been shown, it should be understood that various changes or modifications may be made within the scope of the appended claims without departing from the spirit of the invention.

What is claimed is:
1. An optical detecting apparatus comprising:
   oscillation means for providing an oscillation signal,
   divider means for dividing said oscillation signal according to a first predetermined ratio and providing a light source flash signal of frequency higher than that of an expected disturbance light and an operating time signal divided according to a second ratio a plurality of times longer than said first predetermined ratio, an invisible light source means for blinking according to said light source flash signal, a light receptive element for receiving output light from said invisible light source, shift means for successively shifting a light signal receptive to said light receptive element by a clock input synchronous with said oscillation signal during the time when said operating time signal is inputted, comparator means for comparing the signal output from said shift means with a set value, and light detection signal output means adapted to be set by a coincidence signal outputted from said comparator means and reset when said operating time signal is terminated.

2. An optical detecting apparatus comprising:

oscillation means for providing an oscillation signal, divider means for dividing said oscillation signal according to a first predetermined ratio and providing a light source flash signal of frequency higher than an expected disturbance light and an operating time signal divided according to a second ratio a plurality of times larger than said first ratio, position detecting means composed of invisible light sources and light receptive elements disposed in a plurality of pairs, index means for indexing a pair of the invisible light source and the light receptive element from said plurality of pairs and updating said index when said operating time signal is terminated, shift means for successively shifting a light signal receptive to said indexed light receptive element by a clock input synchronous with said oscillation signal during the time when said operating time signal is inputted, comparator means for comparing the signal output from said shift means with a set value, and light detection signal output means adapted to be set by a coincidence signal outputted from said comparator means and reset when said operating time signal is terminated.

* * * * *